United States Patent [19]

Pinkerton et al.

[11] Patent Number: 5,180,413
[45] Date of Patent: Jan. 19, 1993

[54] SHEAR MECHANISM FOR GLASSWARE FORMING MACHINE

[75] Inventors: Steven J. Pinkerton, Avon; Alan Menard, Bolton, both of Conn.

[73] Assignee: Emhart Glass Machinery Investments Inc., Wilmington, Del.

[21] Appl. No.: 814,748

[22] Filed: Dec. 24, 1991

[51] Int. Cl.⁵ .............................................. C03B 7/12
[52] U.S. Cl. ........................................ 65/334; 65/332; 83/623
[58] Field of Search ...................... 65/334, 332; 83/623

[56] References Cited

U.S. PATENT DOCUMENTS

| 4,246,820 | 1/1981 | Dahms | 83/623 |
| 4,813,994 | 3/1989 | Kulig | 65/334 |
| 4,944,207 | 7/1990 | Nebelung et al. | 65/334 |

Primary Examiner—Joye L. Woodard
Attorney, Agent, or Firm—Spencer T. Smith

[57] ABSTRACT

A shear mechanism has a pair of shear assemblies mounted on parallel guide rails for reciprocating displacement controlled by a rack and pinion assembly having a rack driving each shear assembly. The racks are parallel and horizontally spaced and their movement paths substantially intersect the center of mass of the shear assemblies.

4 Claims, 9 Drawing Sheets

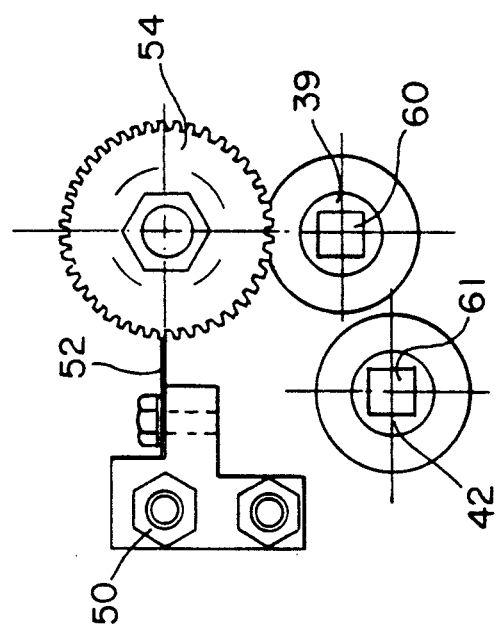

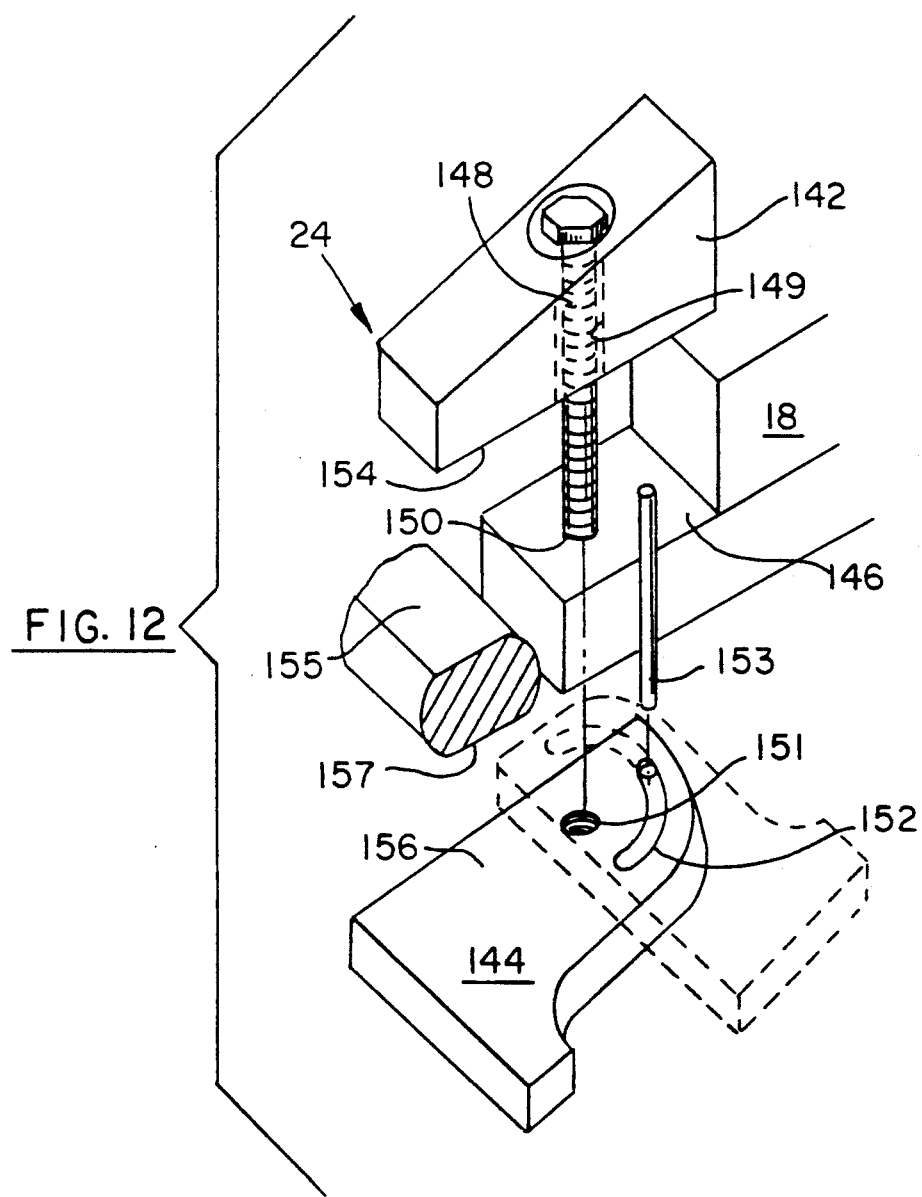

SHEAR MECHANISM FOR GLASSWARE FORMING MACHINE

Individual section glassware forming machines form glassware from discrete gobs of molten glass. Vertically depending runners of molten glass are fed to a shear mechanism which servers the runners to form these gobs.

Shear mechanisms may operate at 200 cycles per minute with one or more runners being hit by opposed shear blades to sever the runners every cycle. It is accordingly very difficult to achieve the degree of smoothness of operation that is desired.

As shown in U.S. Pat. Nos. 4,214,497 and 4,699,643 the opposed shear blade assemblies are both driven at the same side where the elongated guide rail supports ride on vertically spaced guide rails.

It is an object of the present invention to provide an improved shear mechanism where the forces which reciprocate the opposed shear assemblies is substantially in line with the center of mass of the driven assembly.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is a view taken at 2—2 of FIG. 1;

FIG. 3 is a view taken at 3—3 of FIG. 1;

FIG. 12 is an exploded view of the quick release support bearing shown in FIG. 1.

Figure 1:
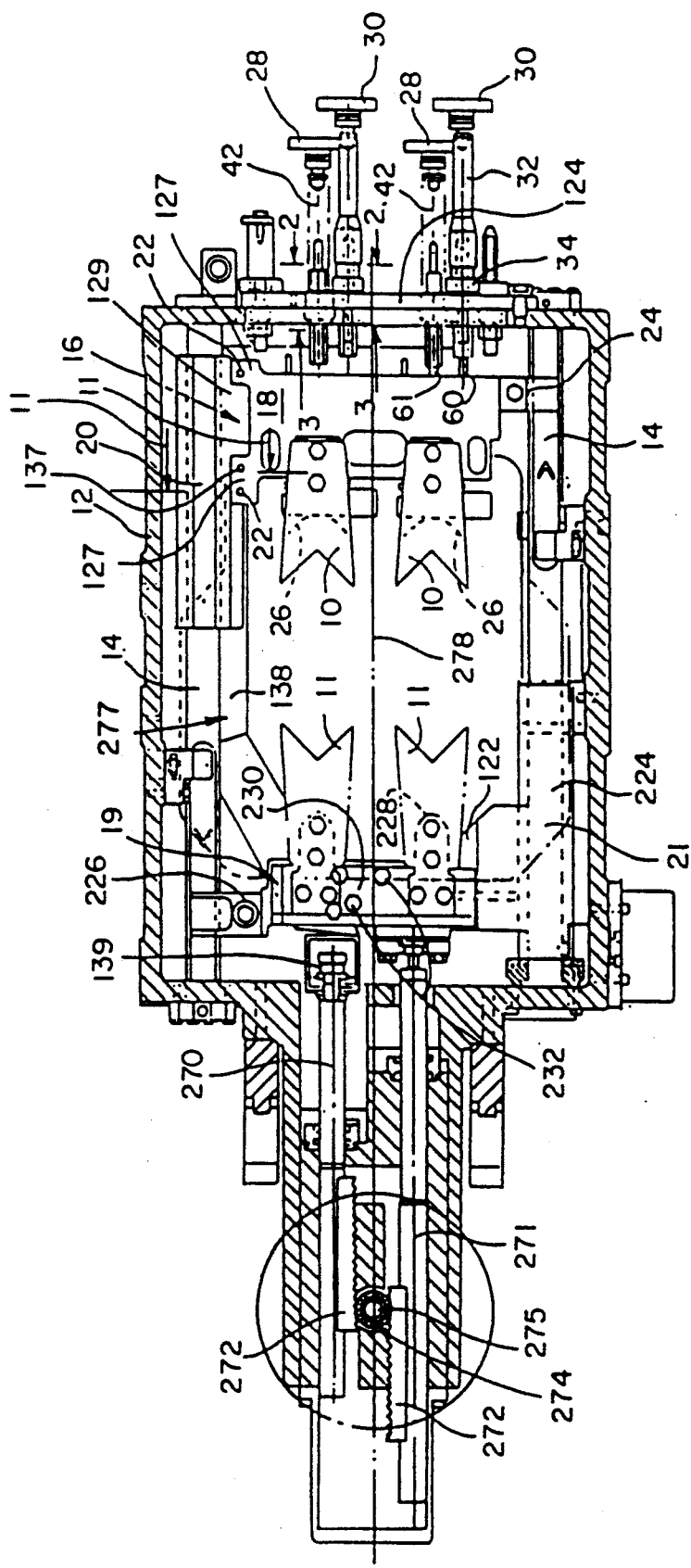
FIG. 1 is a top view of a portion of a shear mechanism made in accordance with the teachings of the present invention.

The shear mechanism has pairs (two in the illustrated embodiment) of opposed upper 10 and lower 11 shears which are supported within a frame 12 for reciprocating displacement. A pair of guide shafts 14 extend along either side of the frame and slidably support the upper blade assembly 16 which includes a shear assembly housing 18 and an elongated tubular guide shaft support 20. The housing 18 is secured at one side via screws 22 to the guide shaft support 20 and is slidably interconnected with the lower guide shaft 14 by a bearing support 24.

Associated with each upper shear blade 10 is a drop guide 26. The position of each drop guide 26 is independently changeable laterally from side to side (transverse displacement) and forwardly and rearwardly (longitudinal displacement) relative to the shear blade 10. Rotation of the associated longitudinal displacement knob 28 will result in the longitudinal displacement of the drop guide 26 and rotation of an associated transverse displacement knob 30 will result in the transverse displacement of the drop guide. Rotation of the transverse displacement 30 knob rotates a shaft 32 and attached drive gear 34 (FIG. 2) which via an idler 36 rotates a driven gear 38 secured to a drive shaft 39 having a bore 40 which is square in cross section. The longitudinal displacement drop guide knob 28 is connected to a drive shaft 42 which also has a square bore 40. A hex surface 44 is defined on the shaft outer diameter which operates together with a spring 46 supported by a block 47 to define a detent to hold the shaft at a desired orientation. Also secured to the frame 12 is a block 50 (FIG. 3) supporting a spring 52 which is operatively associated with an enlarged fine toothed wheel 54 which is secured to the gob guide transverse displacement shaft 32 so that lateral adjustments can be made in fine increments.

As can be seen from FIG. 1, each of the drop guide drive shafts 39, 42 receives a driven shaft 60, 61 which extends rearwardly from the shear assembly housing 18 and which has a matching square cross section. The length of both the drive shafts and the driven shafts is selected so that they will be operatively associated throughout the displacement of the shear assembly housing 18.

Figure 4:
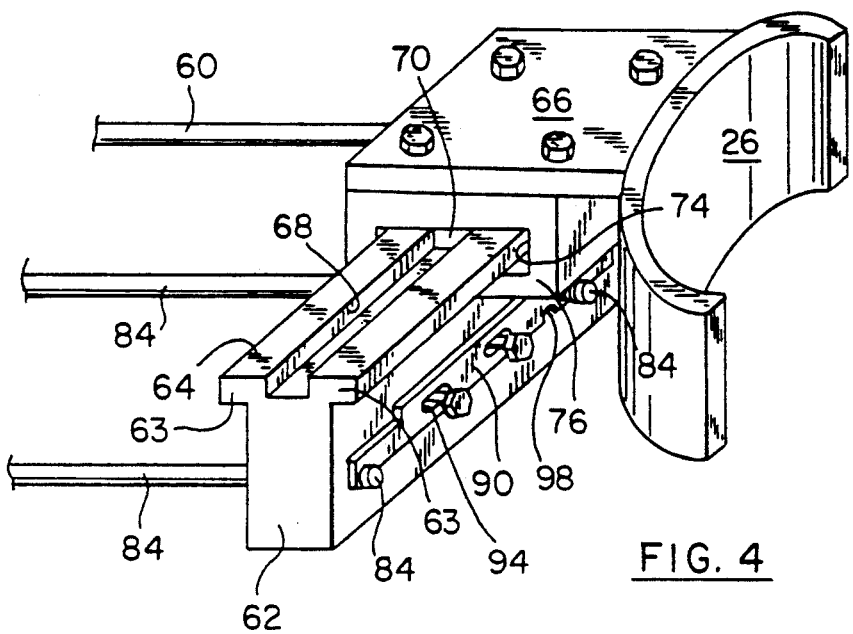
FIG. 4 is an oblique view of a drop guide assembly.
Figure 5:
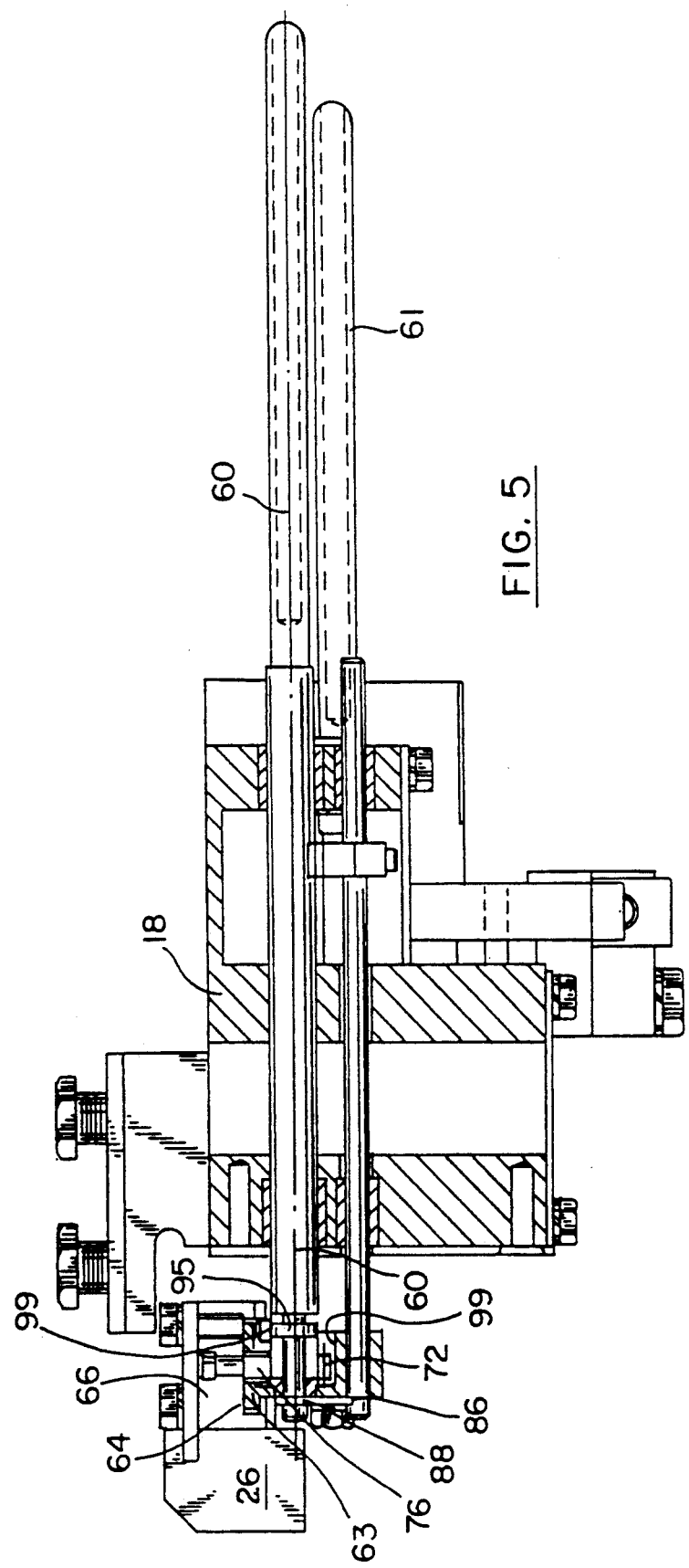
FIG. 5 is a view taken at 5—5 of FIG. 6.

Each drop guide assembly (FIG. 4) includes a base 62 having opposed transverse top flanges 63 which define a slide surface 64 supporting and guiding the lateral displacement of the gob drop guide support block 66 to which the drop guide 26 is secured. The slide includes a lateral groove 68 which receives a rack 70 secured to the bottom of the block 66 and driven by a pinion 72 (FIG. 5) secured to the end of the drop guide transverse displacement driven shaft 60. The block has a laterally extending opening 74 which is partially defined by opposed inwardly extending shelves 76 for capturing the base flanges 63.

Figure 7:
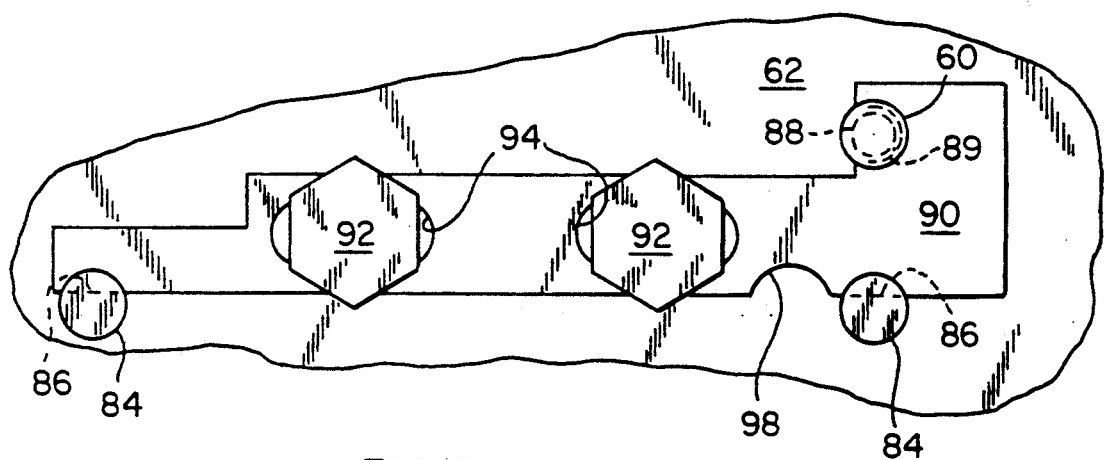
FIG. 7 is a front view of the drop guide connecting plate.
Figure 6:
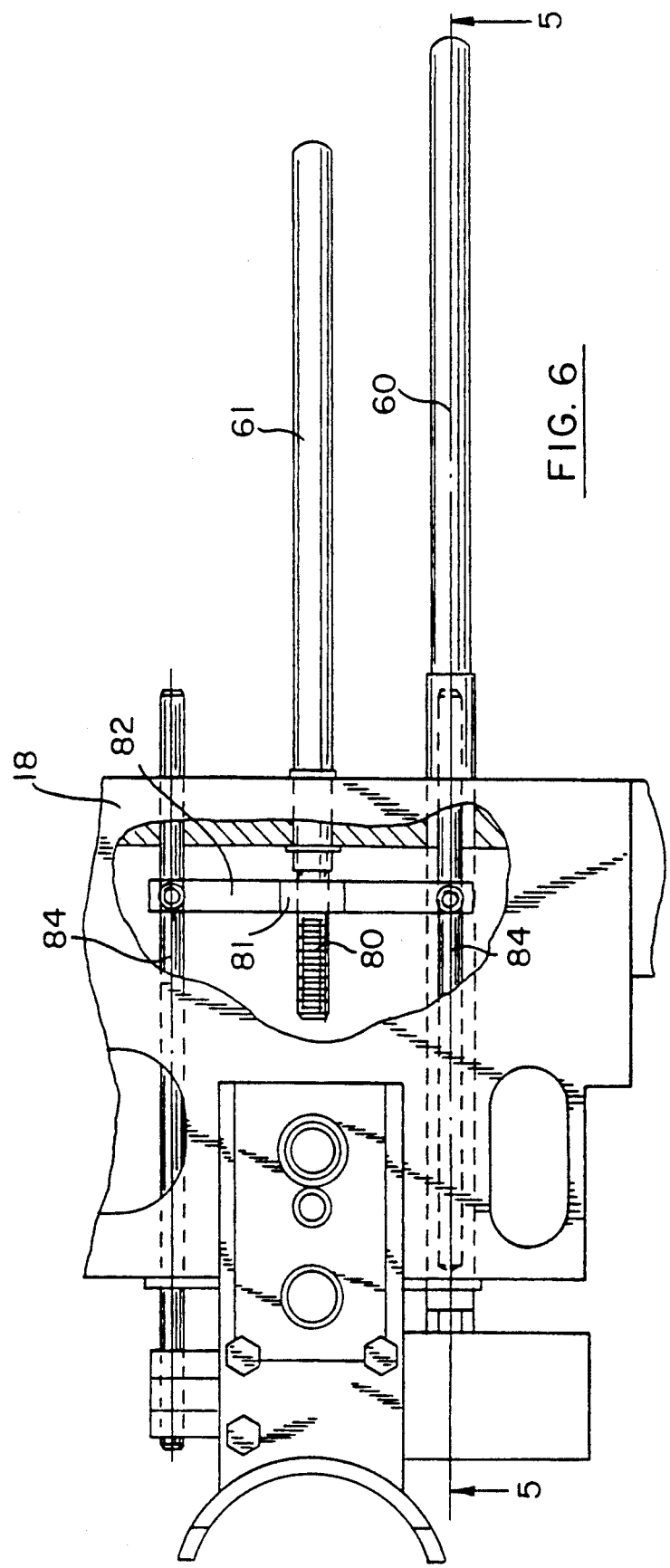
FIG. 6 is an enlarged view of a portion of FIG. 1, with the shear removed.

The front threaded end of the drop guide longitudinal displacement driven shaft 61 (FIG. 6) has a threaded portion 80 which is coupled to a nut 81 carried by cross link 82 which is connected to a pair of rods 84 slidably supported within the housing 18 for relative axial displacement. The base 62 of the drop guide is secured to these rods so that rotation of the control knob 28 will advance or retract the drop guide. A notch 86 is defined near the front end of these rods (FIG. 7) and the front end of the drop guide transverse displacement driven shaft 60 has an annular groove 88 which are captured by the bottom surface of the connecting plate 90 and the cut out 89 when the plate is shifted to the latching position shown in FIG. 7. When the connecting plate is released by loosening a pair of screws 92 which pass through enlarged plate holes 94 and which are received by the drop guide base 62 and shifted to the right so that the plate becomes spaced from the lower left rod 84 and so that a large cut out 98 is adjacent and spaced from the lower right rod 84 and the cut out 89 is spaced from the shaft 60, the entire drop guide assembly can be pulled off the three rods and replaced with another assembly. The pinion 72 (FIG. 5) is secured with a screw 95 to the pinion shaft 60 and the front end of the shaft is supported by a bearing 96 which is press fit within a base opening. The rear opening 99 of the base is large enough so that when the base is released it can be completely pulled from the pinion and supporting shaft.

Figure 8:
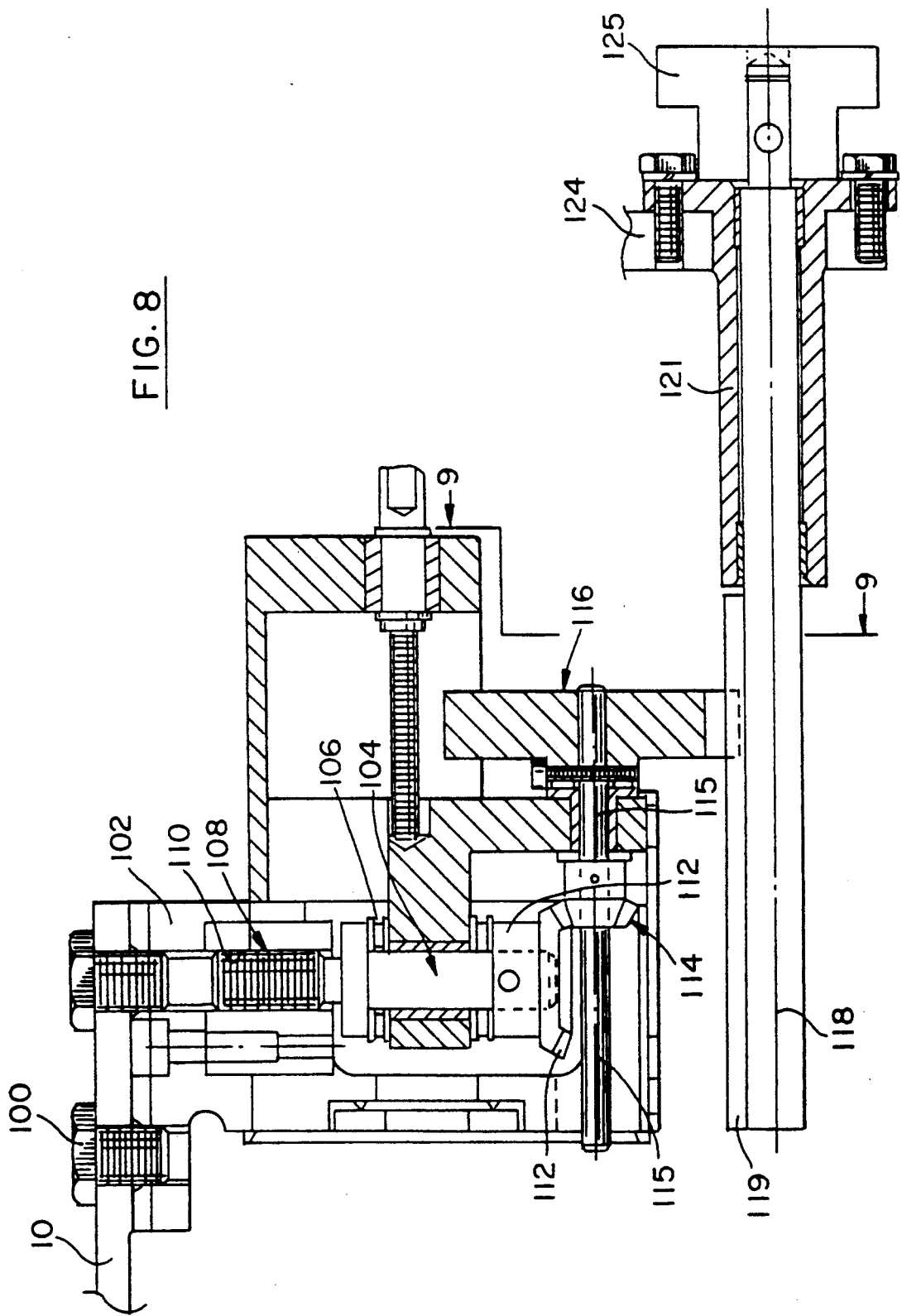
FIG. 8 is an elevational cross sectional view of the tensioning assembly.
Figure 9:
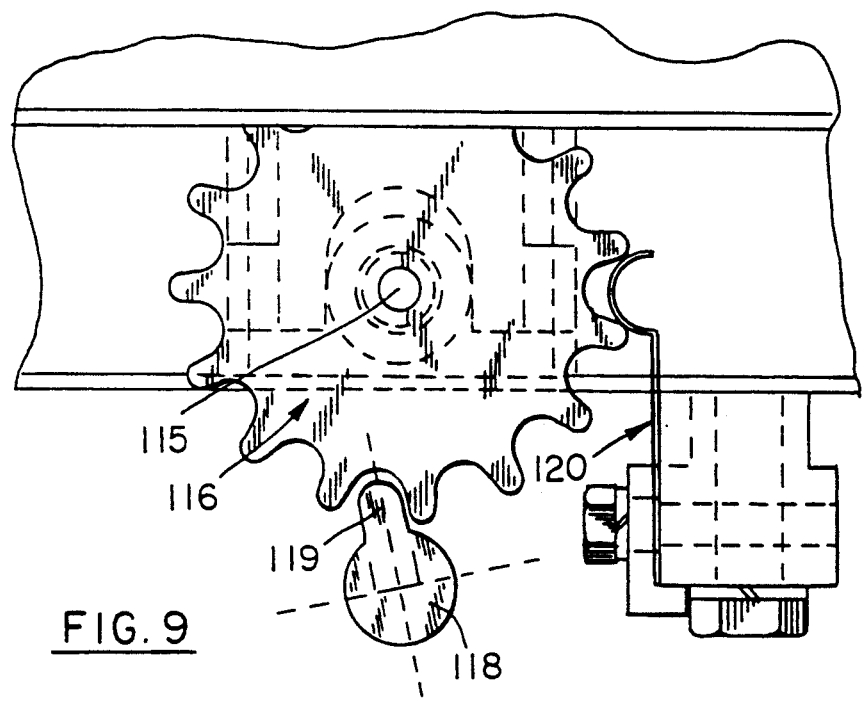
FIG. 9 is a view taken at 9—9 of FIG. 8 showing the indexing wheel operatively associated with an indexing shaft.
Figure 10:
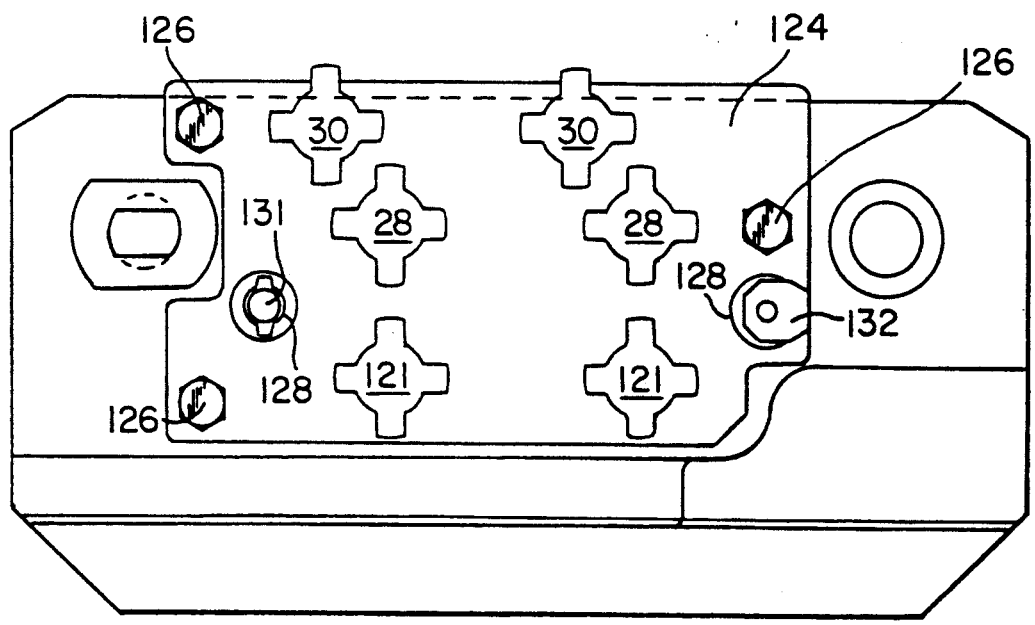
FIG. 10 is an end view of the shear mechanism showing the control knobs.

The shear housing 18 of the upper blade assembly 16 supports a pair of shear blades 10 which are to extend above the opposed shear blades 11 of the lower shear blade assembly 19 when the shear blades are conjointly displaced to the advanced position. They are to frictionally engage each other with a selected force or tension and the tensioning assembly is illustrated in FIG. 8. An upper shear blade 10 is secured by screws 100 to a three piece mounting block 102. A control shaft 104 which is rotatably supported within suitable bearings 106 has a threaded portion 108 at one end which is received by a threaded bore 110 in the mounting block 102. Rotation of the control shaft either elevates or lowers the shear blade to control the desired tension between the upper and lower blades. The other end of the control shaft has a bevel gear 112 which is driven by a bevel gear 114 secured to rotatable rod 115. An indexing wheel 116 is also attached to the rod 115. As can be seen from FIG. 9, this indexing wheel 116 will be indexed one pitch each complete revolution of the tensioning drive shaft 118 which has a single tooth 119 and a spring detent 120 will hold the index wheel at any set location. The tensioning drive shaft 118 is rotatably supported by a mounting sleeve 121 secured to the back plate 124 and changes are made by rotating a control knob 125. As can be seen from FIGS. 1 and 10, the control structure, i.e., the structure from the control knobs 28, 30, and 125 to their drive shafts 39, 42, 118 is mounted on the back plate 124 of the frame 12 which is secured to the frame by a plurality of screws 126. A pair of cylindrical bushings 128 are secured to the back plate for slidably receiving a cylindrical dowel 130 and a diamond pin dowel 131 which are secured to the frame. A removable stop 132 is secured to the end of the cylindrical dowel once the backplate has been placed in position and secured to the frame.

Figure 11:
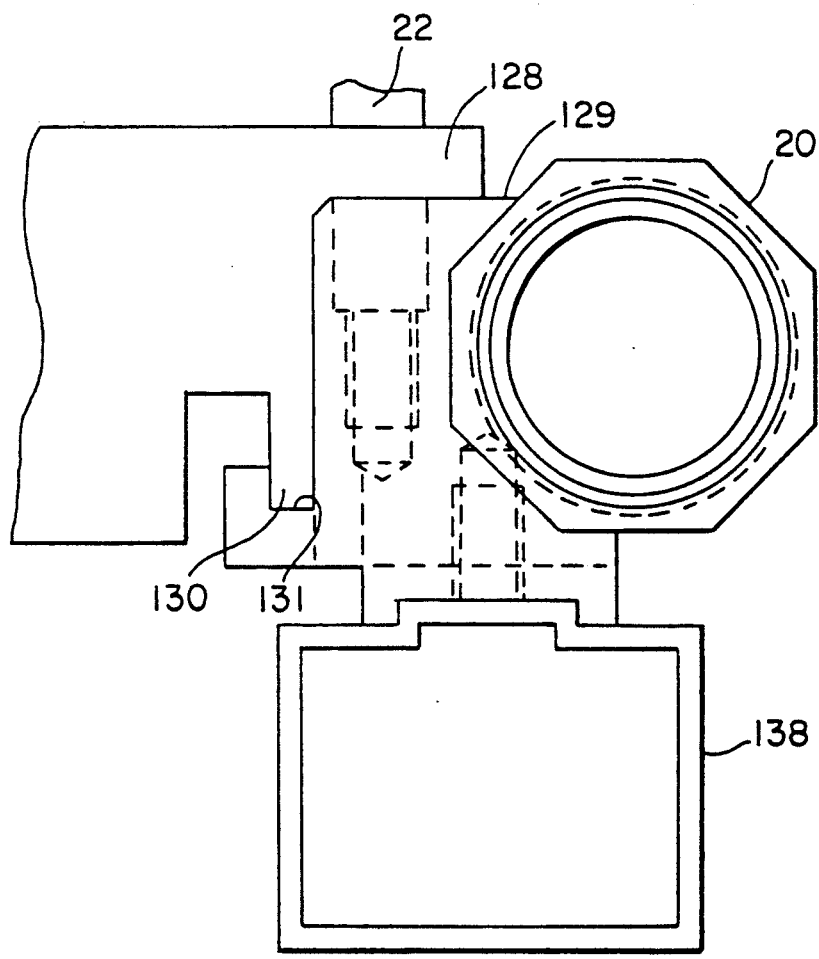
FIG. 11 is a view taken at 11—11 of FIG. 1.

If the shears have to be replaced, the back plate assembly is released and pulled rearwardly until the back plate bushing 128 engages the stop 132. The upper shear assembly is moved forwardly to its advanced position. This relative movement separates the back plate drive shafts 39, 42 from the gob guide driven shafts 60, 61. As shown in FIGS. 1 and 11, the upper shear arm 18 is supported at one side on top of the drive shaft support 20 (spaced flanges 127 rest on horizontal support surface 129 and a vertical rib 130 is received by a suitable slot 131) and is secured in position by a pair of screws 22 (a dowel 137 is support 20 is secured to a frame 138 which is connected to the drive rod 139 (FIG. 1).

The quick release support bearing 24 (FIG. 12) has an upper finger 142 and a lower finger 144. The upper finger sits on a shelf 146 defined on the shear housing 18 and is not free to rotate. A screw 148 passes through enlarged holes 149, 150 in the upper finger and the shelf and threadedly engages a threaded bore 151 in the lower finger 144. The lower finger has an arcuate slot 152 which corresponds to a segment of a circle having a center coincident with the axis of the threaded hole 151 and a pin 153 secured to the shelf extends vertically downwardly parallel to the screw 148 into this slot. When a mechanic loosens the screw 148, the lower finger 144 will rotate counterclockwise until the pin 153 engages one end of the slot 152. At this position the lower finger 144 will, be rotated 90° clear of the guide rail 14 and the shear housing 18 can be removed. When another shear housing is placed in position and the screw 148 is tightened, the lower finger 144 will rotate clockwise until the pin 153 hits the other end of the slot 151 locating the lower finger in the support position. Further tightening of the screw will clamp the fingers to the arm defining a bearing surface between the horizontal flat bottom surface 154 of the upper finger and the flat top 155 of the guide rail and between the top flat horizontal surface 156 on the lower finger and the flat bottom surface 157 of the guide rail.

The lower blade assembly 19 has an arm 122 including an elongated tubular portion 224 for slidably receiving one of the guide shafts 14 and a support bearing 226 to guide the other guide shaft 14. Blade mounting blocks 228 are secured to a mounting plate 230 which is secured to the arm by a pair of screws 232 and a pair of shear blades 11 are secured to these blocks.

To change the configuration of the machine from double gob to triple gob, for example, the mounting plate screws 232 of the lower shear assembly are removed. The mounting plate assembly is replaced with a mounting plate assembly having three blades. (Screw receiving holes are provided in the arm to receive the mounting plate screws of each mounting plate assembly.) Additionally, the upper shear blade housing and back plate assembly are removed and replaced with a shear blade housing and back plate assembly having the desired configuration.

Since shear blade tensioning and gob drop guide adjustments all can be made from the rear end of the frame, the shear assembly drive mechanism can be centrally located at the front end of the frame. The shear assemblies are driven by displacable rods 270, 271 which have racks 272 secured thereto to be driven by a pinion 274 which is secured to the output shaft 275 of a servo motor 276. The drive rods 270, 271 also lie in a horizontal plane (the shears move in a horizontal plane) so that they will lie on either side of the centerline 278 of the frame. In the lower shear blade assembly which supports the lower shears 11 the elongated guide rail support 21 rides along the lower guide rail and the center of mass of the reciprocating shear assembly is below the centerline substantially in line with the lower shear assembly drive rod 271.

The upper guide rail support 20 and the tubing 277 interconnecting the upper drive rod 270 and the upper guide rail support all lie near the upper guide rail and accordingly, the center of mass of the upper shear assembly from the tubing 277 to the quick release bearing support 24 lies above the centerline substantially in line with the upper rod 270.

We claim:

1. A shear mechanism for shearing discrete gobs from at least one runner of molten glass comprising
   a frame, including front and rear walls interconnecting opposed sides,
   a pair of guide rails extending between said walls proximate the sides of said frame, a centerline extending parallel to said guide rails and located centrally therebetween,
   one shear blade assembly mounted for reciprocating movement along said guide rails, said assembly including an elongated guide rail support operatively associated with one of said guide rails and the center of mass of said one shear blade assembly being located on one side of said centerline of said frame,
   a second shear blade assembly mounted for reciprocating movement along said guide rails, said second assembly including an elongated guide rail support operatively associated with the other guide rail and the center of mass of said second shear blade assembly being located on the other side of said centerline of said frame, horizontally related rack and pinion means including
- first rack means connected to said one shear blade assembly and displacable along an axis substantially intersecting the center of mass of said one shear blade assembly, and
- second rack means connected to said second shear blade assembly and displacable along an axis substantially intersecting the center of mass of said second shear blade assembly.

2. A shear mechanism according to claim 1, wherein said rack and pinion means includes a pinion secured to the rotating output shaft of a servo motor and located between and operatively engaging said first and second rack means.

3. A shear mechanism according to claim 2, wherein the shear blade assembly remote from said rack and pinion means comprises
- at least one vertically displacable shear blade, and
- a corresponding number of adjustable drop guide assemblies.

4. A shear mechanism according to claim 1 wherein said rack and pinion means including a pinion rotatable about an axis selectively located on said centerline between and operatively engaging said first and second rack means.

* * * * *